(12) United States Patent
Ben-Hamadou

(10) Patent No.: US 10,627,898 B2
(45) Date of Patent: Apr. 21, 2020

(54) CONTROL METHOD, CONTROL DEVICE, SYSTEM AND MOTOR VEHICLE COMPRISING SUCH A CONTROL DEVICE

(71) Applicant: VALEO COMFORT AND DRIVING ASSISTANCE, Créteil (FR)

(72) Inventor: Achraf Ben-Hamadou, Bobigny (FR)

(*) Notice: Subject to any disclaimer, the term of this patent is extended or adjusted under 35 U.S.C. 154(b) by 97 days.

(21) Appl. No.: 15/562,232

(22) PCT Filed: Mar. 25, 2016

(86) PCT No.: PCT/FR2016/000059
§ 371 (c)(1),
(2) Date: Mar. 21, 2018

(87) PCT Pub. No.: WO2016/156678
PCT Pub. Date: Oct. 6, 2016

(65) Prior Publication Data
US 2018/0203506 A1 Jul. 19, 2018

(30) Foreign Application Priority Data
Mar. 27, 2015 (FR) ...................................... 15 52618

(51) Int. Cl.
*G06F 3/01* (2006.01)
*G06F 3/16* (2006.01)
(Continued)

(52) U.S. Cl.
CPC .............. *G06F 3/013* (2013.01); *B60K 35/00* (2013.01); *B60K 37/06* (2013.01); *G06F 3/017* (2013.01);
(Continued)

(58) Field of Classification Search
CPC .. G06F 3/013; G06F 3/017; G06F 2203/0381; B60K 35/00; B60K 37/06;
(Continued)

(56) References Cited

U.S. PATENT DOCUMENTS 9,223,415 B1* 12/2015 Zhou .................. G06K 9/00335
2010/0220290 A1* 9/2010 Chen ...................... A61B 3/113
351/210
(Continued)

FOREIGN PATENT DOCUMENTS

EP 2806335 A1 11/2014
WO 02/25637 A1 3/2002

OTHER PUBLICATIONS

International Search Report of the International Searching Authority issued in PCT/FR2016/000059 dated Jul. 27, 2016 (2 pages).
(Continued)

*Primary Examiner* — Mark Edwards
(74) *Attorney, Agent, or Firm* — Osha Liang LLP

(57) ABSTRACT

The invention relates to a method for a user to control a device. According to the invention, the method comprises the following steps:—identification of a device located in a viewing direction of the user (100) by means of analysis of at least one image obtained by an image sensor (111) and containing at least part of the user's (100) face; determination of an oral instruction; transmission of a command associated with the determined oral instruction to the device identified. The invention also relates to a control device (110) in which such a method can be carried out, as well as a system (110, 121, 122) and a motor vehicle (130) comprising such a device (110).

16 Claims, 3 Drawing Sheets

Figure 1:
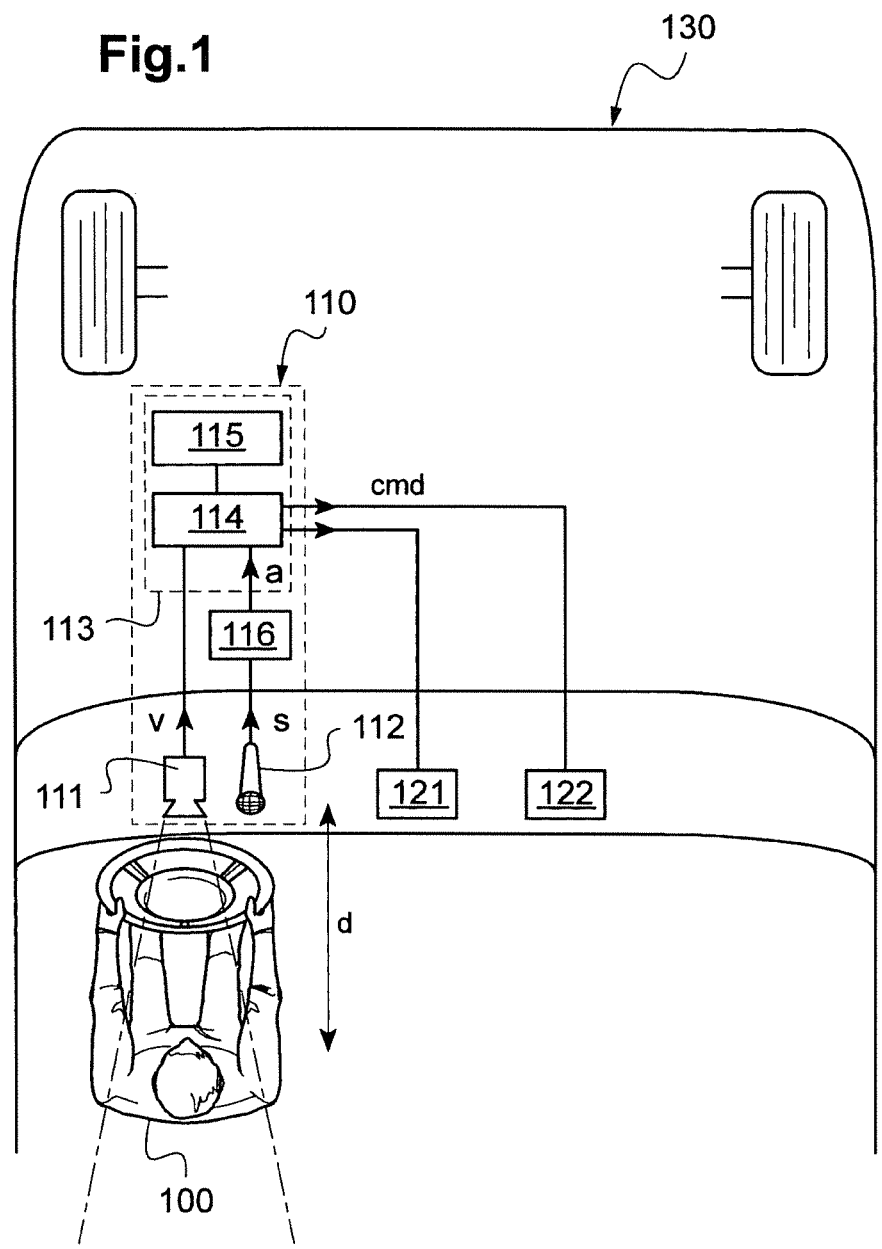

(51) Int. Cl.
*G10L 15/22* (2006.01)
*B60K 35/00* (2006.01)
*G10L 15/00* (2013.01)
*B60K 37/06* (2006.01)
*G10L 15/25* (2013.01)

(52) U.S. Cl.
CPC ............. *G06F 3/167* (2013.01); *G10L 15/00* (2013.01); *G10L 15/22* (2013.01); *G10L 15/25* (2013.01); *B60K 2370/148* (2019.05); *B60K 2370/149* (2019.05); *B60K 2370/1531* (2019.05); *G06F 2203/0381* (2013.01); *G10L 2015/226* (2013.01)

(58) Field of Classification Search
CPC .... B60K 2350/1044; B60K 2350/2017; G10L 15/00; G10L 15/22; G10L 15/25; G10L 2015/226
USPC ........................................................ 345/156
See application file for complete search history.

(56) References Cited

U.S. PATENT DOCUMENTS

| 2012/0169582 | A1  | 7/2012  | Tschirhart |
|---|---|---|---|
| 2014/0247232 | A1* | 9/2014  | George-Svahn .......... G06F 3/02 345/173 |
| 2014/0350942 | A1* | 11/2014 | Kady .................. B60R 16/0231 704/275 |
| 2016/0202757 | A1* | 7/2016  | Miao ....................... H04N 5/33 348/78 |

OTHER PUBLICATIONS

Written Opinion of the International Searching Authority issued in PCT/FR2016/000059 dated Jul. 27, 2016 (5 pages).

* cited by examiner

US 10,627,898 B2

CONTROL METHOD, CONTROL DEVICE, SYSTEM AND MOTOR VEHICLE COMPRISING SUCH A CONTROL DEVICE

TECHNICAL FIELD TO WHICH THE INVENTION IS RELATED

The present invention relates generally to the field of human-machine interfaces allowing a user to contactlessly interact with electrical or electronic devices.

It relates more particularly to a control method, a control device, a system and a motor vehicle comprising such a control device.

It is applied particularly advantageously in a motor vehicle provided with auxiliary devices, such as a radio, a GPS location system, or a mobile phone, that the driver of the vehicle may have to control while driving the motor vehicle.

TECHNOLOGICAL BACKGROUND

More and more auxiliary electronic devices are provided in motor vehicles for facilitating the use of same or making it more pleasant, e.g. location devices and GPS navigation aids, devices for air conditioning the passenger compartment of the vehicle, for electric window opening and closing, devices for viewing and detecting obstacles, or radios.

Such devices are generally controlled by the driver of the vehicle via buttons or a touch screen. For this, they use at least one of their hands, which distracts them from driving the vehicle itself and means that only one of their hands is then available for maneuvering.

In this context, a contactless control device, allowing the user to control an auxiliary device without having to use one of their hands for this is therefore particularly advantageous. Such a contactless control device may, for example, be based on a system of automatic speech recognition thanks to which oral instructions given by the driver for controlling an auxiliary device are identified.

An interface is known from document U.S. Pat. No. 8,442,820 that makes it possible to contactlessly control an auxiliary device present in a motor vehicle. An oral instruction given by a user for controlling such a device is identified by the interface through a method of automatic speech recognition. Such an oral instruction may also be determined by reading the user's lips, i.e. through analysis of images of their lips acquired when they pronounce such an instruction. The interface then combines the two instructions identified by each of these two methods, giving priority to the instruction identified by speech recognition, in order to produce an instruction intended to control such an auxiliary device.

SUBJECT MATTER OF THE INVENTION

In this context, the invention provides a method for controlling a device by a user, comprising the following steps:
  identification of a device located in a direction of gaze of the user, through analysis of at least one image comprising at least one part of the user's face acquired by an image sensor,
  determination of an oral instruction,
  transmission of a command associated with the determined oral instruction to the identified device.

In such a method, the user thus controls a device without using one of their hands for this, with the advantages, described above, that this entails.

Furthermore, in this method, thanks to the prior identification of a device located in a direction of gaze of the user, the command associated with the determined oral instruction is transmitted to the device for which it is intended. This arrangement is particularly advantageous when specific multiple devices to be controlled are present in the user's environment. In particular, oral instructions, such as "start up" or "switch off" may be common to several of these devices, and it is then crucial to specifically transmit the determined oral instruction to the device for which it is intended.

More generally, the fact of combining information derived from the direction of gaze of the user with an instruction given orally makes it possible to control a device more reliably and more precisely, since multiple items of control information of different origins but aimed at the same purpose are thus combined.

The invention also provides for said oral instruction being determined through analysis of data acquired subsequently to the identification of the device and acquired for a predetermined time period.

The search for an oral instruction given by the user only begins after the user has looked at a specific device to be controlled, and only lasts for a predetermined time period. Selecting such a time interval advantageously reduces errors in identifying an oral instruction, which could otherwise occur more frequently, e.g. during conversations between the driver and a passenger of the motor vehicle.

Other non-restrictive and advantageous features of the method in conformity with the invention are as follows:
  said oral instruction is determined through the analysis of images comprising at least one part of the user's face acquired by the image sensor; thanks to such a method, a user who is mute, or has difficulties in formulating words, may control such a device, without having to use one of their hands for this;
  said oral instruction is determined through analysis of an acoustic signal; and
  said oral instruction is determined by comparing acquired data with reference data selected according to the previously identified device.

The reference data making it possible to identify the oral instruction may thus be selected to correspond to oral instructions specifically associated with the device to be controlled, a device that has been previously identified. This arrangement makes the identification of the oral instruction more reliable and effective, since it is thus optimally suited to each of the devices that may be controlled by the user.

A method may also be provided in which a position and an orientation of the user's eyes are determined during said analysis of at least one image comprising at least one part of the user's face, and in which a device located in the direction of gaze of the user is further identified according to said position and said orientation.

The invention also provides a control device comprising an image sensor and an analysis module designed:
  for identifying a device located in a direction of gaze of the user through analysis of at least one image comprising at least one part of a user's face and acquired by the image sensor,
  for determining an oral instruction, and
  for transmitting a command associated with the determined oral instruction to the identified device.

A control device in which the image sensor is a video camera sensitive to radiation in the visible range and radiation in the infrared range is also provided. In such a device, the analysis module is designed for identifying a device located in a direction of gaze of the user by joint analysis of at least one image comprising at least one part of a user's face acquired by the image sensor in the infrared range, and at least one image comprising at least one part of a user's face acquired simultaneously by the image sensor in the visible range. As explained further on, the combined use of an image acquired in the visible range and an image acquired in the infrared range facilitates the identification of a device located in a direction of gaze of the user.

Other non-restrictive and advantageous features of the device in conformity with the invention are as follows:

the analysis module is designed for repeating said analysis of at least one image comprising at least one part of a user's (100) face until a device located in the direction of gaze of the user (100) has been identified;

the analysis module is designed for determining a position and an orientation of the user's eyes through said analysis of at least one image comprising at least one part of the user's face, and is further designed for identifying a device located in a direction of gaze of the user according to said position and said orientation;

the analysis module is designed for acquiring data subsequently to the identification of said device, for a predetermined time period, and for determining said oral instruction through analysis of said acquired data;

the analysis module is designed for determining said oral instruction through analysis of images comprising at least one part of the user's face acquired by the image sensor;

the analysis module is designed for determining said oral instruction through analysis of an acoustic signal;

the analysis module is designed for determining said oral instruction by comparing acquired data with reference data selected according to the previously identified device; and the analysis module is designed for determining said oral instruction by combining the result of the analysis of an acoustic signal with the result of the analysis of images comprising at least one part of the user's face acquired by the image sensor.

A system is also provided comprising an image sensor, an analysis module, a first device and a second device, in which the analysis module is designed:

for determining, through analysis of at least one image comprising at least one part of the user's face, acquired by the image sensor, if the first device or if the second device is located in a direction of gaze of the user, for determining an oral instruction through analysis of images comprising at least one part of the user's face acquired by the image sensor, and for transmitting a command associated with the determined oral instruction to said device located in a direction of gaze of the user.

The invention also provides a motor vehicle provided with a control device as described above.

DETAILED DESCRIPTION OF AN EMBODIMENT

The following description in conjunction with the attached drawings, given by way of non-restrictive examples, will elucidate the substance of the invention and how it may be implemented.

In the attached drawings:

FIG. 1 schematically represents a device in which a method in conformity with the invention may be implemented, this device being in this example embedded in a motor vehicle.

Figure 2:
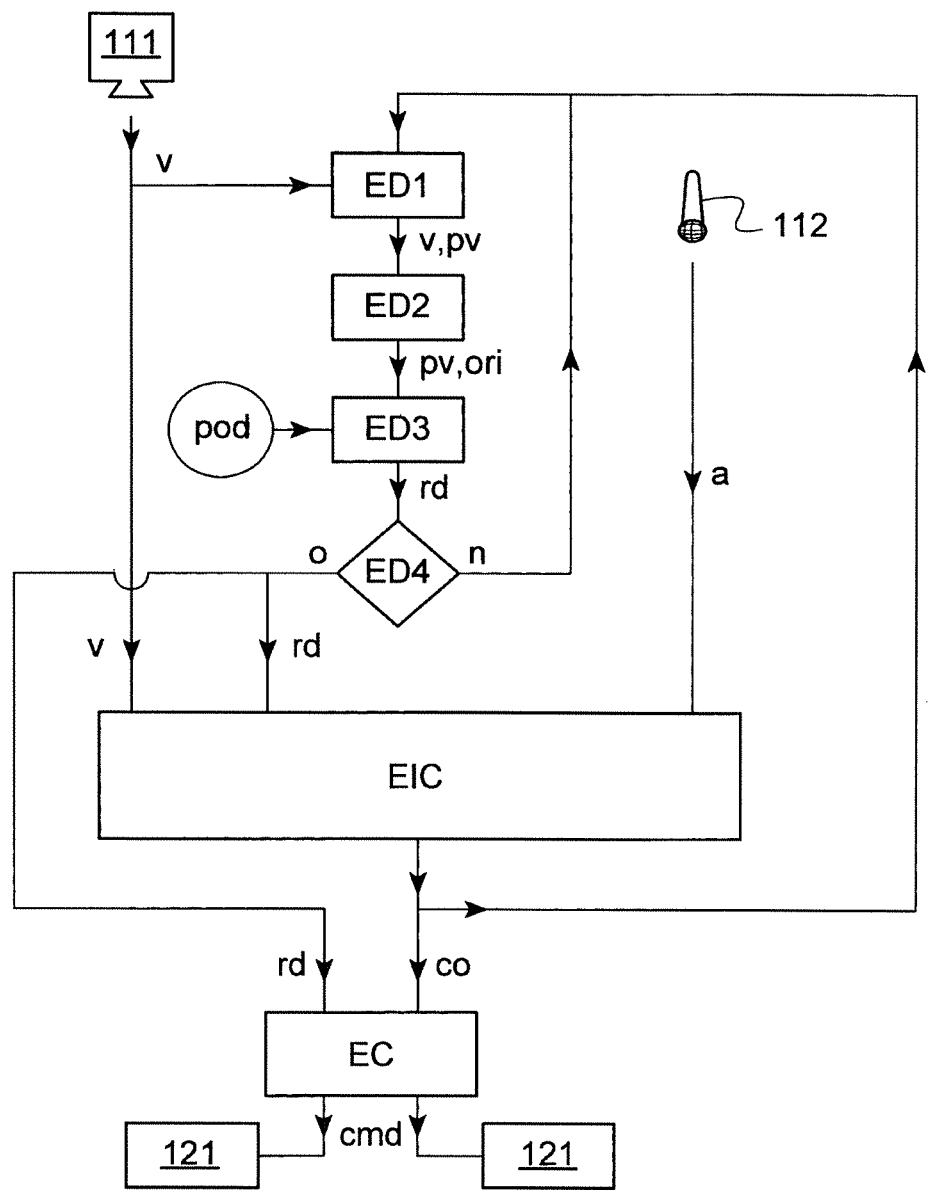

FIG. 2 schematically represents the main steps of such a method, and

Figure 3:
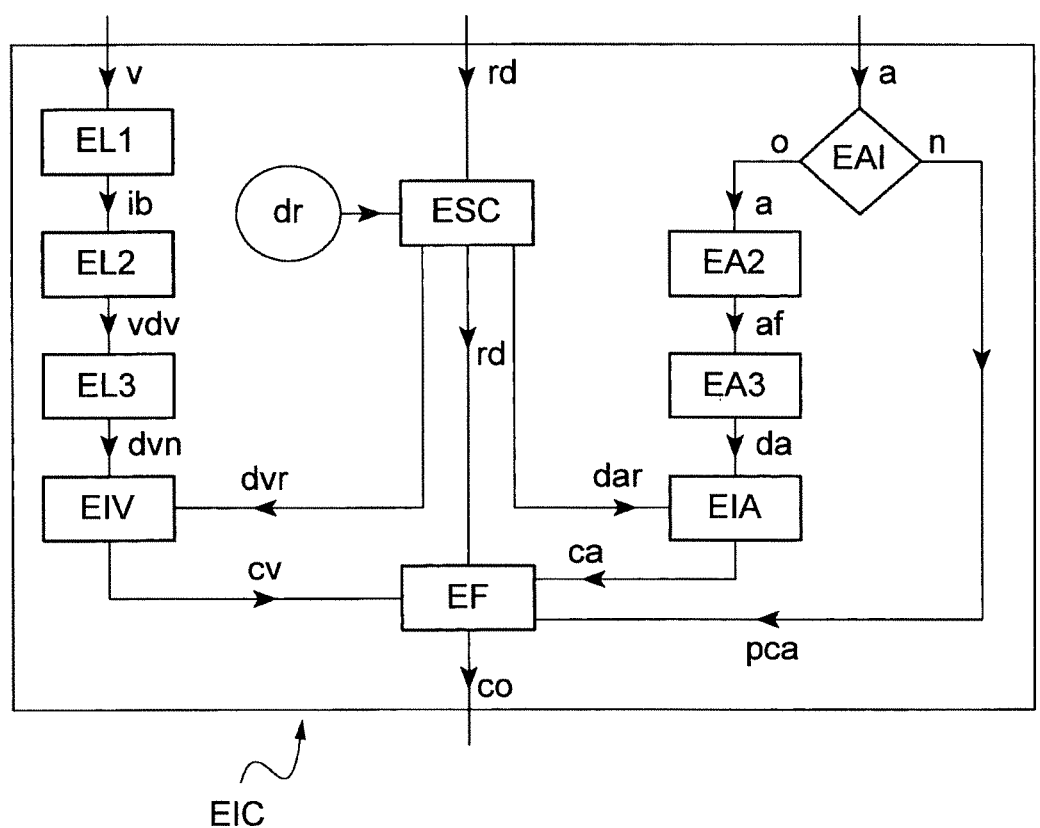

FIG. 3 schematically represents one of these steps in more detail.

FIG. 1 schematically represents a motor vehicle 130 and a user 100, here the driver of the motor vehicle 130. In addition to driving the motor vehicle 130, the latter may have to control one or more auxiliary devices, e.g.:

a first device 121, such as a location device 121 using GPS ("Global Positioning System") signals, and a second device 122, such as a radio.

In other embodiments, the user may have to control a greater number of auxiliary devices, which may, for example, comprise a control device for controlling the headlights of the motor vehicle 130 or a device controlling the opening or closing of the windows of the motor vehicle 130.

An image sensor 111, such as a video camera, is placed facing the user's 100 face, as represented in FIG. 1. The image sensor 111 is designed and placed so that the user's face is completely included in the field of vision of the image sensor 111. It may be advantageous here to use a "multimodal" image sensor 111, i.e. sensitive both to radiation in the visible range and, for example, to radiation in the infrared range. Indeed, as subsequently described, one of the steps of the method provided here consists in pinpointing the position of the user's face within the acquired images. The information provided by additional images taken in the infrared range facilitates this pinpointing, notably since the user's body (notably at the level of their face) has a higher temperature than its surroundings, and therefore stands out in an image taken in the infrared range. Thanks to the images acquired in the infrared range, the user may also control the devices 121 and 122 in accordance with the method described below, even at night or in contexts in which the light is too low for the images acquired in the visible range to be usable.

The images acquired by the image sensor 111 are transmitted, in the form of a video stream v, to an analysis module 113.

An acoustic signal sensor 112, e.g. a microphone, is placed near the image sensor 111, facing the user 100. It delivers an electrical signal s representative of the acoustic signals that it measures. An analog-to-digital converter 116 converts the electrical signal s into digital form. The audio stream "a" thus produced is transmitted to the analysis module 113.

The analysis module 113 comprises a processor 114, such as a microprocessor, and a memory storage module 115, such as a rewritable nonvolatile memory. The analysis module 113 processes the audio stream "a" and the video stream v for identifying in these streams, according to a method detailed below in the description of FIGS. 2 and 3, an oral instruction intended for controlling one of the previously mentioned devices. If such an instruction is identified, it is transmitted to one of the devices 121 or 122, as explained below.

A method in conformity with the invention, such as that described below, may be implemented in a control device 110 comprising the analysis module 113, the image sensor 111, the acoustic signal sensor 112 and the analog-to-digital converter 116 associated therewith.

FIG. 2 schematically represents the main steps of such a method.

During the latter, the image sensor 111 continuously films the user's 100 face. The analysis module 113 analyzes the corresponding video stream v, in the course of steps ED1 through ED4, for detecting whether the user's eyes are directed toward one of the devices 121 or 122.

The user's face is first identified, in an image IM extracted from this video stream v, in step ED1. The analysis of this image makes it possible to determine the position and orientation of the user's face, which is pinpointed by a set of geometric parameters pv. These parameters pv may, for example, correspond to coordinates pinpointing the position of characteristic points of said face in the image IM. Such characteristic points may, for example, correspond to the ends of the chin or the eyebrows, or the nostrils of the user 100. They may also correspond to the vertices of a polyhedron into which the user's face fits. The parameters pv make it possible to pinpoint the user's face three-dimensionally.

The three-dimensional character of the pinpointing of the user's face may, for example, be obtained by optimizing the matching of the two-dimensional image IM and a three-dimensional model of the user's face previously recorded in the memory storage module 115.

This three-dimensional model may, for example, comprise data representative of the geometry of rigid parts of the user's face, such as coordinates of points pinpointing the superciliary arches, the nose, or the temples.

In order to compare such a three-dimensional model with the two-dimensional image IM, the processor 114 may, for example, for a given orientation and position of the three-dimensional model, calculate the positions of such characteristic points by projection in the two-dimensional image IM. The position and orientation of the user's face are then determined by searching for the position and orientation of the three-dimensional model that optimizes the matching between the positions of the characteristic points resulting from the three-dimensional model and the positions of the same characteristic points identified in the image IM.

In the next step, ED2, data ori representative of the position and orientation of the user's eyes are obtained, by analyzing the image IM. The data pv making it possible to pinpoint the user's face may be used in the course of step ED2 to extract the area corresponding to the user's eyes from the image IM.

An image of reduced size occupied predominantly by the image of the user's eyes is thus obtained, then analyzed in order to determine the position and orientation of each of the user's eyeballs. The orientation of an eyeball of the user in relation to their face may, for example, be deduced from the position, in the image IM, of the center of the pupil of this eyeball in relation to the ends of the user's eyelid.

Analyzing images the size of which has been reduced mainly by selecting the area occupied by the user's eyes, reduces the calculation time needed for this processing. The latter's reliability is further improved, since, in the analysis of such an image, predominantly occupied by the images of the user's eyes, the analysis module cannot confuse, for example, the center of the pupils of the user's eyes with the center of their nostrils.

In the next step, ED3, the analysis module 113 determines whether the user's eyes are turned in the direction of one of the devices 121 or 122. For this, the data pv making it possible to pinpoint the user's face may be combined with the data ori representative of the position and the orientation of their eyes, in order to determine toward which points of space the latter are turned.

The area in space occupied by each of said devices is also known (the corresponding data pod are stored in the memory storage module 115), which finally makes it possible to determine whether the user's eyes are turned in the direction of one or other of the devices 121 or 122.

In the embodiment described above, the image analysis technique used is static, in the sense that an image IM of the video stream v is analyzed independently of the other images of this stream. Another possibility, for determining whether the user's eyes are turned toward one of the devices 121 or 122, is to carry out a dynamic analysis of a sequence of multiple images.

In the course of such an analysis, changes occurring from one image to the other make it possible to detect movements of the face or movements of the user's eyes associated with a change in direction of their gaze. Such movements may, for example, be detected by following the evolution, in such a sequence of images, of the position of characteristic points of the face such as the tip of the chin, the ends of the eyebrows, or the centers of the pupils. The analysis module 113 may then analyze such changes in the direction of the user's gaze associated with said movements, in order to determine whether they are looking at one of the devices 121 or 122. In the situation represented in FIG. 1, the analysis module 113 may, for example, determine that the driver has turned their gaze toward the device 122 when a marked movement of their eyes to their right is detected.

The result of the image analysis implemented in steps ED1 through ED3 is summarized by the value assigned to a variable rd. This value indicates whether one of the devices 121 or 122 has been targeted by the user's gaze, and, if so, indicates which device has been targeted (and therefore selected by the user as explained below). For example, the value 0 will be assigned to the variable rd if the user's eyes are not turned toward any of the auxiliary devices, the value 1 will be assigned thereto if the user's eyes are turned toward the GPS location device 121, and the value 2 will be assigned thereto if the user's eyes are turned toward the radio 122.

If the preceding analysis indicates that neither of the devices 121 or 122 has been selected at the end of step ED3 (i.e. if it is determined in the course of a step ED4 that rd=0), the process continues with the analysis of the next image, or sequence of images, of the video stream v, again according to steps ED1, ED2, then ED3.

The process of tracking the user's gaze thus continues as long as neither of the devices 121 or 122 has been selected (through orientation of the user's 100 gaze in the direction of a device 121, 122).

On the other hand, when the analysis module 113 determines, in the course of step ED4 carried out following step ED3, that the user has looked at one of these devices, the process continues with step EIC.

In the course of step EIC:
the audio stream "a" is acquired and processed by the analysis module 113, in order to detect therein sound sequences corresponding to oral instructions intended to control the device identified at the end of step ED3 (and designated by the value of the variable rd), and
the video stream v is simultaneously acquired and processed by the analysis module 113 in order to visually detect, in the stream of images of the user's 100 lips, sequences corresponding to such Instructions.

In step EIC, the audio and video streams are acquired for a limited (predetermined) time period. This time period may go up to a few seconds; it is, for example, less than 10 s. The analysis of these streams may be carried out continuously, as they are acquired.

The analysis module 113 finally combines the result of the two analyses, audio and video, mentioned above, in order to determine whether the user 100 has given an instruction intended to control the device identified at the end of step ED3, and which instruction co is involved.

This instruction co is converted in step EC into a command cmd suitable for controlling the device identified in step ED3. The command cmd is then transmitted to the latter by the analysis module 113. The device can then execute this command cmd. For example, if the device identified in step ED3 is the radio 122, and if the determined instruction co is the instruction "start", the radio 122 may switch on upon receiving the command cmd if it was previously turned off or in standby state. The command cmd received by the device may be processed and transformed by the latter before executing same, in order, for example, to merge same with commands received directly via, for example, a touch screen provided on said device.

In the example described here, as explained above, the search for an oral instruction in the audio and video streams (step EIC) therefore only begins if the user has looked at one of the devices 121 or 122, and it is limited in time. Selecting such a time interval advantageously reduces errors in identifying an oral instruction, which could otherwise occur more frequently, e.g. during conversations between the driver 100 and a passenger of the motor vehicle 130.

The operations carried out in the course of step EIC described above are schematically represented in more detail in FIG. 3.

The analysis of the audio stream "a" carried out during step EIC begins with a step EA1 which makes it possible to test whether or not this stream is usable. When the sound level of this stream is very low, for example, or when it predominantly contains interference, it is pointless to use it. The processing of the audio stream "a" then ceases at this stage, and a variable pca indicates that no instruction has been identified therein. On the other hand, if the characteristics of the audio stream "a" indicate that it is usable, the treatment of same continues with a step of filtering (step EA2) which makes it possible to reduce the contribution of interference in the stream "a". This filtering may, for example, be carried out by a Wiener filter, or consist of a linear filtering giving preference to a determined range of frequencies.

The audio stream af resulting from this filtering is processed in step EA3, in order to produce data da representative of the contents thereof, hereafter referred to as descriptors. The analysis module may produce such a descriptor da by identifying phonemes in the audio stream af, i.e. by detecting the presence of a phoneme, by determining which phoneme is involved, by pinpointing the position of same in the audio stream af and by assigning a sound intensity thereto.

The set of descriptors da thus extracted is then compared with reference audio descriptors dar, in step EIA. The reference audio descriptors dar may comprise a list of sequences of phonemes, each sequence of phonemes (e.g. the sequence/start/) corresponding to an oral instruction intended to control one of the devices 121 or 122 (this instruction here being the instruction "start"). The comparison of the descriptors da and dar makes it possible to identify such an oral instruction in the audio stream "a".

The result of step EIA is summarized by data ca which indicate whether an oral instruction has been identified in the audio stream "a", which, if so, indicate the instruction involved, and which may also indicate a level of reliability associated with the identification of this instruction.

A set of descriptors dr, which the processor 114 can access, is stored in the memory storage module 115. This set contains the set of audio descriptors and video descriptors corresponding to oral instructions intended to control the various auxiliary devices present in the vehicle, e.g. those mentioned previously. In a step ESD, the processor selects from among these descriptors dr audio descriptors dar and video descriptors dvr that both correspond to instructions specifically associated with the device identified in the previous step ED3.

The fact of comparing the audio descriptors da extracted from the audio stream "a" with reference descriptors dar specifically associated with the previously identified device here makes the identification of an oral instruction reliable and effective, since it is thus optimally suited to each of the devices that are controllable by the user.

In parallel with the analysis of the audio stream "a" described above, the analysis module 113 processes the video stream v in order to identify oral instructions given by the user, from the images of their lips, as explained below.

This processing begins with a step EL1 in the course of which three-dimensional representations ib describing the geometry of the user's lips are obtained from the video stream v.

In order to obtain such representations, the analysis module first performs a three-dimensional pinpointing of the user's face, thanks to an analysis of the images of the video stream v similar to that carried out in step ED1. This pinpointing is carried out for all of the images comprised in the video stream acquired in step EIC.

The three-dimensional pinpointing of the user's face in the field of vision of the image sensor 111 notably makes it possible to pinpoint the position of the user's lips and thus to then associate with each image a right parallelepiped positioned three-dimensionally around same. The position of each vertex of this right parallelepiped in said (two-dimensional) image is then determined by projection, which makes it possible to delimit an area of said image of reduced size (thumbnail), predominantly occupied by an image of the user's lips. The reduced size images thus extracted are then analyzed to produce a set ib of three-dimensional representations describing the geometry of the user's lips for any time period during which the video stream has been acquired.

Such a three-dimensional representation may be obtained by a process similar to that used for obtaining a three-dimensional representation of the user's face, which is described above. The fact of using images of reduced size, reduces the calculation time needed for this processing. The latter's reliability is thereby further improved, since, in the analysis of such an image, predominantly occupied by the images of the user's lips, the analysis module cannot confuse a characteristic point of the user's lips with, for example, a point on the user's temple.

In the next step EL2, descriptors representative of the shape and movement of the user's lips are extracted from the three-dimensional representations ib produced in step EL1.

These descriptors are extracted so as to be representative of geometries taken usually by the lips during the pronunciation of phonemes, or to be representative of temporal evolutions in geometry corresponding to the pronunciation of sequences of phonemes. The process of extraction of such descriptors is also designed to discriminate effectively between two phonemes or two sequences of different phonemes.

The descriptors thus extracted are assembled in the form of a vector of descriptors vdv. In step EL3, the data contained in the latter are concatenated and put into a normalized form to produce a normalized video descriptor dvn the format of which is suitable for comparing with reference video descriptors dvr.

The normalized video descriptor dvn is compared with reference video descriptors dvr, in step EIV in order to finally identify an oral instruction given by the user, in the video stream v. As mentioned above the reference video descriptors dvr are previously selected from among descriptors dr, and correspond to instructions specifically associated with the device previously identified in step ED3.

Just as for the analysis of the audio stream "a", the fact of comparing the video descriptor dvn extracted from the stream v with reference descriptors dvr specifically associated with the previously identified device, here makes the identification of an oral instruction reliable and effective, since it is thus optimally suited to each of the devices that are controllable by the user.

The result of step EIV is summarized by data cv which indicate whether an oral instruction has been identified in the video stream v, which, if so, indicate the instruction involved, and which may also indicate a level of reliability associated with the identification of this instruction.

In step EF, the analysis module 113 combines the result of the two analyses, audio and video, described above, in order to finally determine whether the user 100 has given an oral instruction intended to control the device identified at the end of step ED3, and which instruction is involved.

When the oral instruction identified by analysis of the audio stream "a" is identical to the oral instruction identified by analysis of the video stream v, this oral instruction is adopted as the oral instruction to be used for controlling the device identified at the end of step ED3, as explained below.

When an oral instruction identified by analysis of the audio stream "a" is different from an oral instruction identified by analysis of the video stream v, the instruction finally adopted may be selected according to the level of reliability associated with each of these identifications.

When an instruction co is finally determined at the end of step EF, it is then transmitted to the device identified at the end of step ED3.

The invention claimed is:

1. A method for controlling a device by a user comprising:
    identification of a device located in a direction of gaze of the user, through analysis of at least one image comprising at least one part of the user's face acquired by an image sensor;
    determination of an oral instruction;
    transmission of a command associated with the determined oral instruction to the identified device;
    controlling the identified device by tracking the direction of gaze of the user using the at least one image acquired by the image sensor, wherein the image sensor is sensitive both to radiation in a visible range and to radiation in an infrared range; and
    identification of the device by joint analysis of a first image of the at least one image comprising the at least one part of a user's face acquired by the image sensor in the infrared range, and a second image of the at least one image comprising the at least one part of a user's face acquired simultaneously by the image sensor in the visible range,
    wherein the first image acquired by the image sensor in the infrared range and the second image acquired simultaneously by the image sensor in the visible range are transmitted in a form of a video stream for the joint analysis.

2. The method as claimed in claim 1, in which said oral instruction is determined through analysis of data acquired subsequently to the identification of the device and acquired for a predetermined time period.

3. The method as claimed in claim 1, in which said oral instruction is determined through the analysis of images comprising at least one part of the user's face acquired by the image sensor.

4. The method as claimed in claim 1, in which said oral instruction is determined through analysis of an acoustic signal.

5. The method as claimed in claim 1, in which said oral instruction is determined by comparing acquired data with reference data selected according to the previously identified device.

6. The method as claimed in claim 1, in which a position and an orientation of the user's eyes are determined during said analysis of at least one image comprising at least one part of the user's face, and in which a device located in the direction of gaze of the user is further identified according to said position and said orientation.

7. A control device comprising an image sensor, and an analysis module, wherein:
    the analysis module identifies a device located in a direction of gaze of the user through analysis of at least one image comprising at least one part of a user's face and acquired by the image sensor,
    the analysis module determines an oral instruction,
    the analysis module transmits a command associated with the determined oral instruction to the identified device,
    the analysis module controls the identified device by tracking the direction of gaze of the user using the at least one image acquired by the image sensor, wherein the image sensor is sensitive both to radiation in a visible range and to radiation in an infrared range,
    wherein the device is identified by joint analysis of a first image of the at least one image comprising the at least one part of a user's face acquired by the image sensor in the infrared range, and a second image of the at least one image comprising the at least one part of a user's face acquired simultaneously by the image sensor in the visible range, and
    wherein the first image acquired by the image sensor in the infrared range and the second image acquired simultaneously by the image sensor in the visible range are transmitted to the analysis module in a form of a video stream for the joint analysis.

8. The control device as claimed in claim 7, in which the analysis module repeats said analysis of at least one image comprising at least one part of a user's face until a device located in the direction of gaze of the user has been identified.

9. The control device as claimed in claim 7, in which the analysis module determines a position and an orientation of the user's eyes through said analysis of at least one image comprising at least one part of the user's face, and is further designed for identifying a device located in a direction of gaze of the user according to said position and said orientation.

10. The control device as claimed in claim 7, in which the analysis module acquires data subsequently to the identification of said device, for a predetermined time period, and for determining said oral instruction through analysis of said acquired data.

11. The control device as claimed in claim 7, in which the analysis module determines said oral instruction through analysis of images comprising at least one part of the user's face acquired by the image sensor.

12. The control device as claimed in claim 11, in which the analysis module determines said oral instruction through analysis of an acoustic signal.

13. The control device as claimed in claim 7, in which the analysis module determines said oral instruction by comparing acquired data with reference data selected according to the previously identified device.

14. The control device as claimed in claim 12, in which the analysis module determines said oral instruction by combining the result of the analysis of an acoustic signal with the result of the analysis of images comprising at least one part of the user's face acquired by the image sensor.

15. A system comprising:
an image sensor;
an analysis module;
a first device; and
a second device,
wherein the analysis module determines, through analysis of at least one image comprising at least one part of the user's face, acquired by the image sensor, if the first device or if the second device is located in a direction of gaze of the user, the analysis module determines said oral instruction through analysis of images comprising at least one part of the user's face, acquired by the image sensor, the analysis module transmits a command associated with the determined oral instruction to said device located in a direction of gaze of the user, the analysis module controls said device by tracking the direction of gaze of the user using the at least one image acquired by the image sensor, wherein the image sensor is sensitive both to radiation in a visible range and to radiation in an infrared range, wherein the device is identified by joint analysis of a first image of the at least one image comprising the at least one part of a user's face acquired by the image sensor in the infrared range, and a second image of the at least one image comprising the at least one part of a user's face acquired simultaneously by the image sensor in the visible range, and wherein the first image acquired by the image sensor in the infrared range and the second image acquired simultaneously by the image sensor in the visible range are transmitted to the analysis module in a form of a video stream for the joint analysis.

16. A motor vehicle provided with a control device as claimed in claim 7.

* * * * *